No. 825,628.

PATENTED JULY 10, 1906.

O. H. WELCH.
NUT LOCK.
APPLICATION FILED DEC. 26, 1905.

UNITED STATES PATENT OFFICE.

ORIN HARPER WELCH, OF ANDERSON, CALIFORNIA.

NUT-LOCK.

No. 825,628.  Specification of Letters Patent.  Patented July 10, 1906.

Application filed December 26, 1905. Serial No. 293,262.

*To all whom it may concern:*

Be it known that I, ORIN HARPER WELCH, a citizen of the United States, residing at Anderson, in the county of Shasta and State of California, have invented new and useful Improvements in Nut-Locks, of which the following is a specification.

My invention relates to devices for preventing nuts from coming loose on bolts. Its object is to provide a simple, cheap, practical nut-lock for use in railway and bridge construction and wherever such devices are needful or applicable.

It consists of the parts and the construction and combination of parts, as hereinafter more fully described and claimed, having reference to the accompanying drawings, in which—

Figure 1:
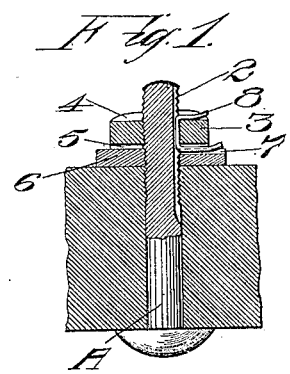
Figure 2:
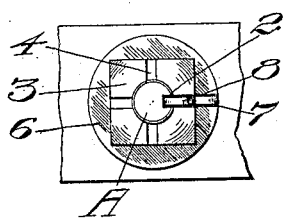
Figure 3:

Figure 1 is a longitudinal section through my nut-lock, showing the key in position. Fig. 2 is a plan view of same. Fig. 3 shows the key.

A represents a bolt having a longitudinal groove 2 of suitable length and depth.

3 is a nut for the bolt and has upper and lower radial grooves 4 5 on its sides. Usually each side of the nut would be correspondingly grooved, with the upper and lower grooves on each side arranged in a vertical plane.

6 is a washer of suitable description having a radial groove 7 on its upper surface.

8 is a key made of wire or like stiff bendable material and bent in the shape of a right angle, with one leg of the angle adapted to seat in the groove 7 in washer 6 and the other to seat in the groove 2 in the bolt, the grooves and the wire being so proportioned as to permit the nut to be screwed on or off easily when the key is entirely housed in the grooves.

With the nut screwed down tight onto the washer and with one set of its upper and lower grooves 4 5 in register with the grooves 7 and 2 the nut is effectually locked against any independent turning on the bolt by simply bending the two ends of the key toward each other till one portion of the key seats or interlocks in the upper groove of the nut and the other portion of the key seats or interlocks in the under groove of the nut.

By bending the ends of the key back into the original position in grooves 7 and 2 to release the nut the latter may be easily unscrewed like any common nut, thus permitting the same nut and bolt, and even the same key, to be used over and over again.

The invention is applicable to bolts and nuts of any size or description. Once the key is bent to interlock with the nut in the manner shown and described the nut is firmly and permanently held in place. Under some circumstances it may be possible to dispense with the radial grooving of the washer.

Having thus described my invention, what I claim, and desire to secure by Letters Patent, is—

In a nut-lock, the combination of a longitudinally-grooved bolt, a washer having a radial groove in its upper surface, a nut having corresponding upper and lower radial grooves, and an angular bendable key having one arm to lie in the groove in the bolt to allow the nut to be screwed on or off and the other arm to seat in the groove in the washer, said several grooves in the bolt, washer and nut being registrable and the ends of the key bendable to interlock in the grooves in the bolt and nut.

In testimony whereof I have hereunto set my hand in presence of two subscribing witnesses.

ORIN HARPER WELCH.

Witnesses:
E. L. STORY,
L. E. LEONARD.